United States Patent Office 2,858,250
Patented Oct. 28, 1958

2,858,250

PESTICIDAL COMPOSITION CONTAINING A WATER DISPERSIBLE LIGNIN SULFONIC ACID

Robert J. Geary, Blue Point, N. Y.

No Drawing. Application June 13, 1955
Serial No. 515,214

7 Claims. (Cl. 167—42)

This invention relates to multi-purpose pesticidal compositions and more particularly to multi-purpose pesticidal compositions in the form of a dried powder which is suitable for application either as a dust or in spray form.

A great many multi-purpose pesticidal compositions have been placed on the market in the past and these preparations have been available in different physical forms, such as solids, powders, mixtures, pastes, liquids and the like. These compositions usually contain various combinations of insecticides, acaricides and fungicides, in addition to various adjuvants, diluents and the like. In general, the effectiveness of these preparations depends upon many factors. Thus, although it is generally preferable for reasons of economy and to avoid damage to the plant material and other objects being sprayed, that the pesticidal composition be applied in aqueous solution or suspension form, the sprayings which are thus applied must be of such a nature as to adhere to the object being sprayed. Further, this adherence should not be for so short a duration as to minimize the activity of the pesticides contained in such compositions. It should, in other words, be reasonably resistant for extended periods of time to weathering conditions such as rain, and the like, in addition to sunlight, carbon dioxide and the other exudates of the plants, rubbing of the parts of the plants together and the like. When the plants being tested are primarily ornamental in function, as for example roses and other flowering plants, the pesticidal compositions now in use often deleteriously affect the appearance of the plant, for example by depositing unsightly residues on leaf or flower, or the natural aroma of the flower. In view of the substantially water insoluble property of most of the present day organic pesticides, it has been usually found necessary to prepare these compositions in the field in dilute form before spraying. The multi-purpose pesticide compositions may be marketed in a dilute or more or less concentrated form, although they almost always contain large amounts of diluents of a solid form which may at the same time serve as adsorbents, dispersing agents and the like. Some of these diluents may at the same time also serve as sticking agents, as for example the various caseins, albumens, glues and the like. To promote their ready dispersion in water at the time of application, these compositions usually contain small amounts of wetting or dispersing agents added to them for that purpose.

Further, it would be obviously desirable for the average user to be able to keep only one composition on hand which could be employed either as a dust or a spray. Many pest-combating materials are difficult to produce in dry powder form for various reasons. For example, they may be normally liquid, or if solid, they may not be amenable to grinding in the usual manner. Powders containing them may tend to agglomerate, or increase in crystal size, or sublime by virtue of high vapor pressures or the like. The formulation of an acceptable multi-purpose pesticide composition is rendered still more complex in view of the incompatibility of many active pesticides, adjuvants, diluents and the like.

It is an object of this invention to provide an improved multi-purpose pesticidal composition in the form of a powder. It is another object of this invention to provide an improved multi-purpose pesticidal powder which is readily soluble or dispersible in water to produce a concentrated spray composition. It is still another object of this invention to provide such an improved composition which, when applied to the object being protected, or combated, adheres thereto for extended lengths of time without losing effectiveness. A further object of this invention is the provision of such a composition which will not deleteriously affect the appearance, aroma or other desirable properties of the plant being treated or protected. Other objects and advantages will appear as the description proceeds.

The attainment of the above objects is made possible by the instant invention which is based upon the provision of a multi-purpose pesticidal composition in particulate form consisting essentially of about 35 to 65% of a readily water dispersible, preferably water-soluble, lignin sulfonic acid, 65 to 35% of a plurality of organic pesticides and 0 to 4% of adjuvants, by weight. Within these ranges approximately equal amounts of the lignin sulfonic acid and of the pesticides are preferred for optimum results.

The use of readily water dispersible lignin sulfonic acids in pesticidal compositions has of course been known for a long time. However, its use has been largely restricted to small proportions of the composition in comparison with the organic pesticides and inert diluents therein, functioning in the main as a wetting or dispersing agent. The effectiveness of the instant compositions containing such large proportions of lignin sulfonic acids as 35 to 65%, is surprising when it is remembered that the use of large amounts of surface active agents is known to be disadvantageous in reducing adherence to the material being protected or combated because of their ready wettability and solubility in rain, dew and the like. The instant compositions have been found not only to enable the production of highly concentrated spray compositions, but the coatings produced therefrom are highly adherent to the material being sprayed. Further, the effectiveness of the coating against the pest is in many cases greatly prolonged. Thus, in the case of fungicides like dimethyl dithio carbamic acid derivatives of zinc, iron or manganese, the coatings produced from the instant invention not only retain these fungicides during heavy rains, but also delay decomposition thereof by screening out ultraviolet light. The fungicidal effect of these materials, normally limited to about three days, may thereby be extended to at least four days or more in many instances. In the case of Captan, the effect can be enhanced by at least 30%. The dried powders of this invention, while in storage, have been found to resist agglomeration and caking. Thus, DDT which by virtue of its vapor pressure has, in its usual dust formulations the undesirable characteristic of reagglomerating and forming larger masses, may be employed in the compositions of the instant invention to produce powders which disperse readily in water to a very fine subdivision equal to the original grind. Organic phosphates like Parathion, OMPA (octamethyl pyrophosphoramide), Dithio (tetra ethyl di thiopyrophosphate) and the like, which are known to be sensitive to pH variations, can be formulated directly with calcium lignin sulfonate or other similar soluble or dispersible lignin sulfonic acids to form dispersions in water which after spraying are greatly resistant to decomposition by sunlight, plant gases and exudates. Further, the lignin sulfonic acids employed herein in the stated proportions appear to provide an excellent, improved medium for the active insecticides, acaricides and fungicides required in the composition. Coatings produced from the compositions of this invention are also non-toxic to plants, in addition to being substantially invisible and non-injurious to appearance and/or aroma of the plants.

The water dispersible lignin sulfonic acids including their salts, useful in the instant invention are for the most part well known in the art. The usual salts are those of the alkali metals, alkaline earth metals, ammonia and amines, for example sodium, potassium, calcium, magnesium, ammonium and substituted ammonium salts derived from primary, secondary and tertiary amines, such as methylamine, diethylamine, dimethylamine, trimethylamine, triethylamine, ethanolamine, diethanolamine, triethanolamine, isopropropanol amine, ethylene diamine, diethylene triamine, cyclohexylamine, pyridine, morphiline and the like. The lignin residue may be unsubstituted or it may contain substituents known in the art. Thus, the lignin sulfonic acids may contain chlorine or nitro substituents in amounts ranging from 3 to 22% or more. They may have been esterified with low or high molecular weight aliphatic or alicyclic acids such as acetic, butyric, oleic, stearic, abietic, talloil acids and the like. They may have been esterified with aromatic acids also, as for example with benzoylchloride. The lignin residue may have been alkylated with alkylating agents such as aliphatic and aromatic chlorides, for example, benzylchloride, ethylene chloride, allylchloride and the like. The lignin may have been reacted with a phenol or an aldehyde or any combination thereof. It may have been reacted with mono- or polyhydric alcohols to produce the corresponding ethers. It will be seen, therefore, that any readily water dispersible lignin sulfonic acid is operative herein, the common characteristic being the presence of a solubilizing sulfonic acid or sulfonic acid salt group in the molecule. The molecule may, in fact, contain more than one sulfonic group therein. In general, they range from neutral to acid in their reaction. They may therefore, be employed with any pesticidal material which is stable at neutral or acid pH's.

As stated above, the pesticides should be organic in nature, and stable at neutral or acid pH's. The compositions of the instant invention show their greatest advantage, of course, with those organic pesticides which are sparingly soluble in water, and are therefore otherwise difficult to reduce to stable aqueous solution or suspension form for spraying.

The pesticides employed in the compositions of this invention should be composed of about 15 to 60% of a plurality of insecticides, 10 to 60% of a plurality of fungicides, and 5 to 15% of an acaricide based on the total weight of the active pesticides in the composition. The multi-purpose pesticidal compositions of the instant invention have been found highly advantageous in the treatment of rose plants, and the following description is concerned with formulations suitable for such use.

The most common insects infesting rose plants are aphids, thrips, and other chewing and sucking insects and the like. Accordingly, the above-mentioned content of 15 to 60% of insecticides should comprise a major amount of a contact insecticide such as DDT, especially effective against chewing insects and the like, and lesser amounts of an agent such as Dieldrin (1, 2, 3, 4, 10, 10-hexachloro-6, 7-epoxy-1, 4, 4a, 5, 6, 7, 8, 8a-octahydro-1, 4, 5, 6-dimethano-naphthalene) effective against thrips and the like, and of an agent such as Isolan (1-isopropyl-3-methyl pyrazolyl-5-dimethylcarbamate) or Geigy 22870 (3-methyl-pyrazolyldimethylcarbamate) or their homologues, effective against aphids and other sucking insects.

If desired, an insecticide effective against sucking insects may be included, such as one of the organic phosphate insecticides Demeton (O,O-diethyl-O-2-ethylmercaptoethyl thiophosphate and its O,O-dimethyl analogue), Parathion (O,O-diethyl-O,p-nitrophenyl thiophosphate), Dimethyl Parathion (O,O-dimethyl analogue), OMPA, Dithio, EPN (ethyl p-nitrophenyl thionobenzene phosphonate), Malathion (O,O-dimethyldithiophosphate of diethyl mercaptosuccinate), O,O-dimethyl-1-hydroxy-2,2,2-triochloroethylphosphonate, O,O-diethyl-S-isopropyl mercapto methyl dithiophosphate or the like. A knockdown agent may advantageously be included in small amounts such as pyrethins or the like. In some applications, DDT may be substituted by such contact insecticides as TDE (dichlorodiphenyl dichloroethane), Methoxychlor (dimethoxydiphenyl dichloroethane), Chlordane ($C_{10}H_6Cl_8$), Heptachlor, Gamma benzene hexachloride, or the like.

The above-mentioned content of 10 to 60% of fungicides should comprise a major amount of a metallic thiocarbamate compound such as Maneb (manganese ethylene bisdithiocarbamate), Zineb (zinc analogue of Maneb), Naban (disodium analogue of Maneb), Ferbam (ferric dimethyl dithiocarbamate), Ziran (zinc analogue of Ferbam), or the like, a smaller amount of Captan (N - trichloromethylmercapto - 4 - cyclohexene - 1,2-dicarboximide), and if desired, a still smaller amount of Karathane (2,4-dinitro-6-capryl phenol crotonate).

As the acaricide, there may be employed Aramite (butylphenoxyisopropyl chloroethyl sulfite), Ovotran (p-chlorophenyl-p-chlorobenzenesulfonate), Sulphenone (p-chlorophenyl sulfone), Compound 923 (dichlorophenyl benzenesulfonate) or the like.

In general, the active pesticide content of the above described compositions for treating rose plants may comprise:

| | Percent |
|---|---|
| DDT (effective against chewing insects) | 10–30 |
| Dieldrin (effective against thrips) | 2–10 |
| Geigy 22870 (effective against aphids) | 0–15 |
| Organic phosphate (effective against sucking insects and chewing insects) | 0–15 |
| Pyrethrins | 0–10 |
| Maneb | 25–40 |
| Captan | 10–20 |
| Karathane | 0–10 |
| Acaricide such as Aramite | 5–15 |

It will be understood that several of the pesticides in the foregoing list are effective in combating pests other than those against which they are specifically included. Thus, contact insecticides may be generally effective against chewing and sucking insects, thrips, aphids and the like. If Isolan or similar insecticides are omitted, pyrethrins or a similar knockdown agent should be included or vice versa.

The following formulations are illustrative of the multi-purpose organic pesticidal compositions of this invention and are not to be regarded as limitative. It will be understood that all parts and proportions mentioned herein and in the appended claims are by weight unless otherwise indicated.

*Formulation I*

| | Percent |
|---|---|
| DDT | 10.0 |
| Dieldrin | 2.5 |
| Geigy 22870 | 2.0 |
| Maneb | 18.0 |
| Captan | 7.5 |
| Karathane | 4.0 |
| Aramite | 5.5 |
| Emcol 82 (non-ionic surface active polyglycol ester) | 1.0 |
| Vatsol OT (di-octyl ester of sodium sulfosuccinate) | 1.0 |
| Urea | 2.0 |
| Calcium lignin sulfonate | 46.5 |
| | 100.0 |

Formulation II

| | Percent |
|---|---|
| DDT (50% in calcium lignin sulfonate) | 20.0 |
| Dieldrin (50% in calcium lignin sulfonate) | 5.0 |
| Geigy 22870 | 2.0 |
| Maneb | 18.0 |
| Captan (50% in calcium lignin sulfonate) | 15.0 |
| Karathane | 4.0 |
| Aramite | 5.5 |
| Emcol 82 | 1.0 |
| Vatsol OT | 1.0 |
| Urea | 2.0 |
| Calcium lignin sulfonate | 26.5 |
| | 100.0 |

Formulation III

| | Percent |
|---|---|
| DDT | 10.0 |
| Dieldrin | 2.5 |
| Pyrethrins | 2.5 |
| Maneb | 18.0 |
| Captan | 7.5 |
| Karathane | 4.0 |
| Aramite | 5.5 |
| Emcol 82 | 1.0 |
| Vatsol OT | 1.0 |
| Urea | 2.0 |
| Calcium lignin sulfonate | 46.0 |
| | 100.0 |

Formulation IV

| | Percent |
|---|---|
| DDT (50% in calcium lignin sulfonate) | 20.0 |
| Dieldrin (50% in calcium lignin sulfonate) | 5.0 |
| Pyrethrins | 2.5 |
| Maneb | 18.0 |
| Captan (50% in calcium lignin sulfonate) | 15.0 |
| Karathane | 4.0 |
| Aramite | 5.5 |
| Emcol 82 | 1.0 |
| Vatsol OT | 1.0 |
| Urea | 2.0 |
| Calcium lignin sulfonate | 26.0 |
| | 100.0 |

Formulation V

| | Percent |
|---|---|
| DDT | 10.0 |
| Dieldrin | 2.0 |
| Geigy 22870 | 2.0 |
| Malathion | 5.0 |
| Maneb | 18.0 |
| Captan | 7.5 |
| Aramite | 5.5 |
| Triton X=100 (isooctyl phenol deca ethylene glycolether) | 1.0 |
| Vatsol OT | 1.0 |
| Urea | 2.0 |
| Calcium lignin sulfonate | 45.5 |
| | 100.0 |

The urea in the above formulations functions as a stabilizer in minimizing decomposition of the other components caused by the presence of metallic impurities. The calcium lignin sulfonate contains one or two sulfonic acid groups, has a molecular weight of approximately 1000, a pH of about 4.6, and is 94% moisture free.

In those formulations wherein the components are solid in their natural state, they should first be thoroughly mixed as for example by passage through common mixing or blending devices, such as ribbon blenders, ball mills and various types of grinding equipment. The intimate mixture of lignin sulfonic acid and pesticides is then subjected to attrition in order to provide a powder of the type suitable for subsequent use in spray compositions or the like. This attrition, which if desired is capable of producing average particle sizes of about 5 microns or less, may be suitably obtained by use of the fluid energy type grinding means known as air attrition mills or jet pulverizers. In such pulverizing devices, the mixture of lignin sulfonic acid and pesticides is suspended and buffeted in a high velocity gas stream, whereby there occurs the required attrition or abrasion of the particles on each other and on the walls of the pulverizing equipment. Air attrition mills which are suitable for use in preparing these formulations are described in, for example, U. S. Patents No. 2,032,827, No. 2,219,011 and No. 2,284,746.

Where the pesticides are liquid, it is preferred to add a wetting or dispersing agent thereto first, and then spray the resulting liquid mixture or solution upon the lignin sulfonic acid particles while the latter are being agitated in the mixing or blending device. Only a small proportion of wetting or dispersing agent is in this case required, as for example from about ¼ to 2% based upon the weight of the pesticides. The mixture thus obtained contains said material distributed uniformly over and throughout the particles of lignin sulfonic acid, this mixing being facilitated by the wetting or dispersing agent, and therefore a subsequent mixing or grinding operation in an attrition mill is not necessary but only a matter of choice depending upon the desired results. The wetting or dispersing agents useful in the latter case are usually of the anionic type or the nonionic type. The anionic surface active agents are typified by the various higher molecular weight sulfates and sulfonates such as alkylaryl sulfonates, naphthalene formaldehyde sulfonates, N-higher acyl taurines, sulfates of polyoxyethylenated compounds, fatty alcohol sulfates, sulfonated fatty and polycarboxylic acids, etc. The non-ionic surface active agents are typified by the condensation products of a plurality of moles of ethylene oxide with higher aliphatic alcohols, alkyl phenols, amines, amides, fatty acids, and other higher organic compounds containing a reactive hydrogen atom, as disclosed in U. S. Patent No. 1,970,578. It will be understood that these agents may also be included in the formulations of the previous paragraph.

This invention has been disclosed with respect to certain preferred embodiments and various modifications and variations thereof will become obvious to the person skilled in the art. It is to be understood that such modifications and variations are to be included within the spirit and purview of this application and the scope of the appended claims. It will also be understood that the trade names and trademarks recited in the claims have and are restricted to the chemical compositions disclosed therefor in the foregoing description.

I claim:

1. A multi-purpose pesticidal composition in particulate form consisting essentially of about 45 to 65% of a readily water dispersible lignin sulfonic acid, 55 to 35% of a plurality of organic pesticides stable at neutral and acid pH's and up to 4% of adjuvants, said pesticide content being composed of about 15 to 60% of a plurality of insecticides, 10 to 60% of a plurality of fungicides, and 5 to 15% of an acaricide.

2. A composition as defined in claim 1 containing about equal amounts of said lignin sulfonic acid and of said pesticides.

3. A multi-purpose pesticidal composition in particulate form consisting essentially of about 45 to 65% of a readily water dispersible lignin sulfonic acid, 55 to 35% of a plurality of organic pesticides stable at neutral and acid pH's, and up to 4% of adjuvants, said pesticide content being composed of about:

| | Percent |
|---|---|
| DDT | 10–30 |
| Dieldrin | 2–10 |
| Geigy 22870 | 0–15 |
| Organic phosphate insecticide | 0–15 |
| Pyrethrins | 0–10 |
| Maneb | 25–40 |
| Captan | 10–20 |
| Karathane | 0–10 |
| Aramite | 5–15 |

4. A composition as defined in claim 3 containing about equal amounts of said lignin sulfonic acid and of said pesticides.

5. A multi-purpose pesticidal composition containing

| | Percent |
|---|---|
| DDT | 10.0 |
| Dieldrin | 2.5 |
| Geigy 22870 | 2.0 |
| Maneb | 18.0 |
| Captan | 7.5 |
| Karathane | 4.0 |
| Aramite | 5.5 |
| Emcol 82 | 1.0 |
| Vatsol OT | 1.0 |
| Urea | 2.0 |
| Calcium lignin sulfonate | 46.5 |

6. A multi-purpose pesticidal composition containing

| | Percent |
|---|---|
| DDT | 10.0 |
| Dieldrin | 2.5 |
| Pyrethrins | 2.5 |
| Maneb | 18.0 |
| Captan | 7.5 |
| Karathane | 4.0 |
| Aramite | 5.5 |
| Emcol 82 | 1.0 |
| Vatsol OT | 1.0 |
| Urea | 2.0 |
| Calcium lignin sulfonate | 46.0 |

7. A multi-purpose pesticidal composition containing

| | Percent |
|---|---|
| DDT | 10.0 |
| Dieldrin | 2.5 |
| Geigy 22870 | 2.0 |
| Malathion | 5.0 |
| Maneb | 18.0 |
| Captan | 7.5 |
| Aramite | 5.5 |
| Triton X=100 | 1.0 |
| Vatsol OT | 1.0 |
| Urea | 2.0 |
| Calcium lignin sulfonate | 45.5 |

References Cited in the file of this patent

UNITED STATES PATENTS

| 1,958,624 | Howard et al. | May 15, 1934 |
| 2,101,704 | Dangelmajer | Dec. 7, 1937 |

FOREIGN PATENTS

| 573,832 | Great Britain | Dec. 7, 1945 |